United States Patent

[11] 3,601,359

| [72] | Inventor | Domer Scaramucci<br>3245 S. Hattie, Oklahoma City, Okla.<br>73129 |
|---|---|---|
| [21] | Appl. No. | 847,628 |
| [22] | Filed | Aug. 5, 1969 |
| [45] | Patented | Aug. 24, 1971 |

[54] DISC VALVE ASSEMBLY WITH REPLACEABLE
DISC AND SEATS
18 Claims, 6 Drawing Figs.

[52] U.S. Cl. .................................................. 251/148,
                                                    251/306
[51] Int. Cl. .................................................. F16k 1/22
[50] Field of Search .......................................... 137/454.2;
        251/148, 305–308, 315, 298, 301, 175

[56]        References Cited
         UNITED STATES PATENTS

| 1,998,886 | 9/1935 | Scheid | 251/305 X |
| 2,883,147 | 4/1959 | Mirza et al. | 251/301 X |
| 3,244,398 | 4/1966 | Scaramucci | 251/148 |
| 3,497,178 | 2/1970 | Priese | 251/315 X |
| 2,034,216 | 3/1936 | Stout et al. | 251/175 X |

Primary Examiner—Henry I. Klinksiek
Attorney—Dunlap, Laney, Hessin & Dougherty

ABSTRACT: A disc valve assembly, particularly useful between flanges, which has a removable and replaceable disc valve member and removable and replaceable seat. The disc valve member is journally supported in the valve body such that the thrust created by a pressure differential across the disc valve member is carried by the valve body, and yet the rotational interconnecting elements of the disc valve member are also replaceable.

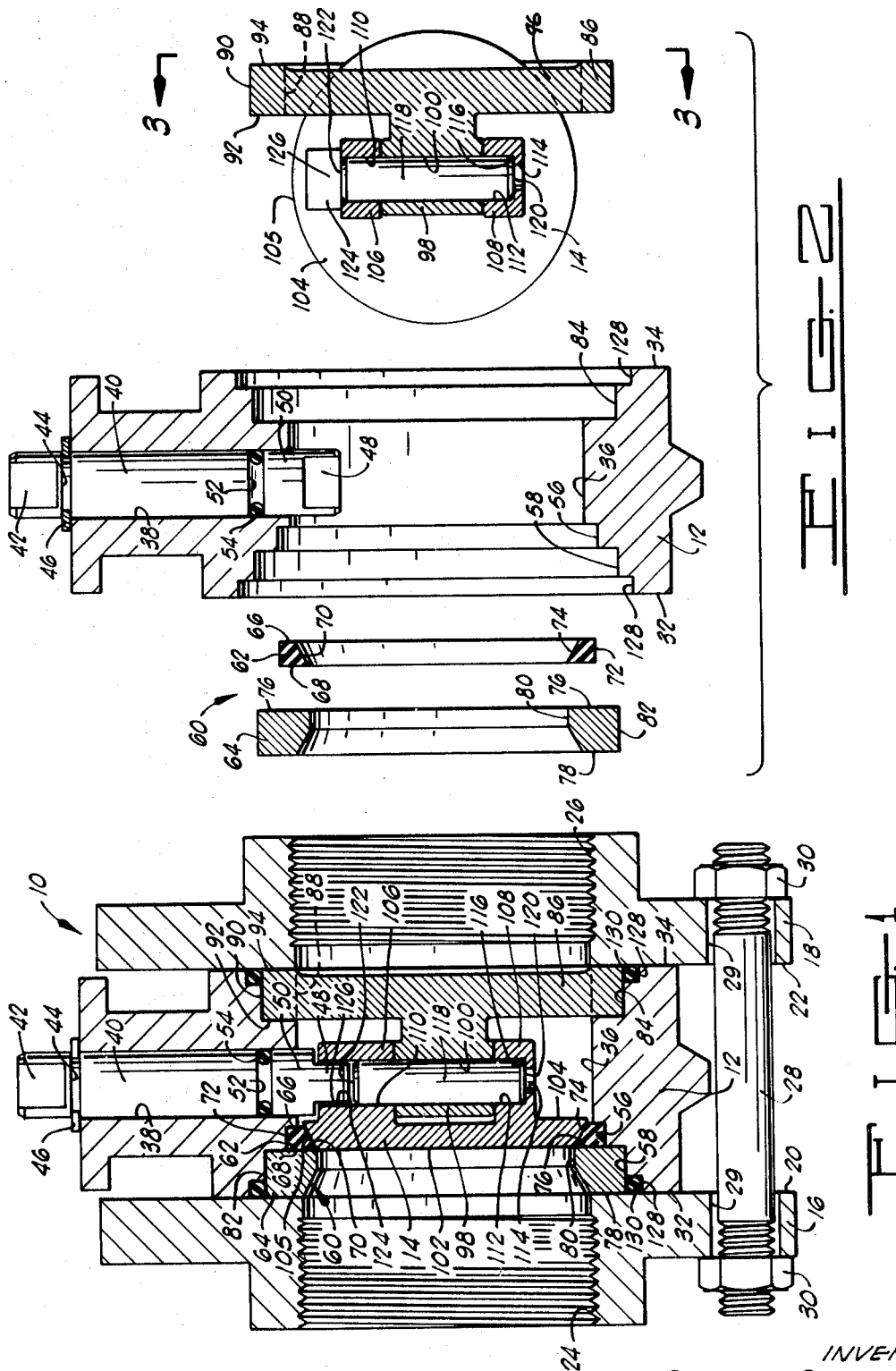

INVENTOR
DOMER SCARAMUCCI

BY
Dunlap, Laney, Hessin & Dougherty
ATTORNEYS

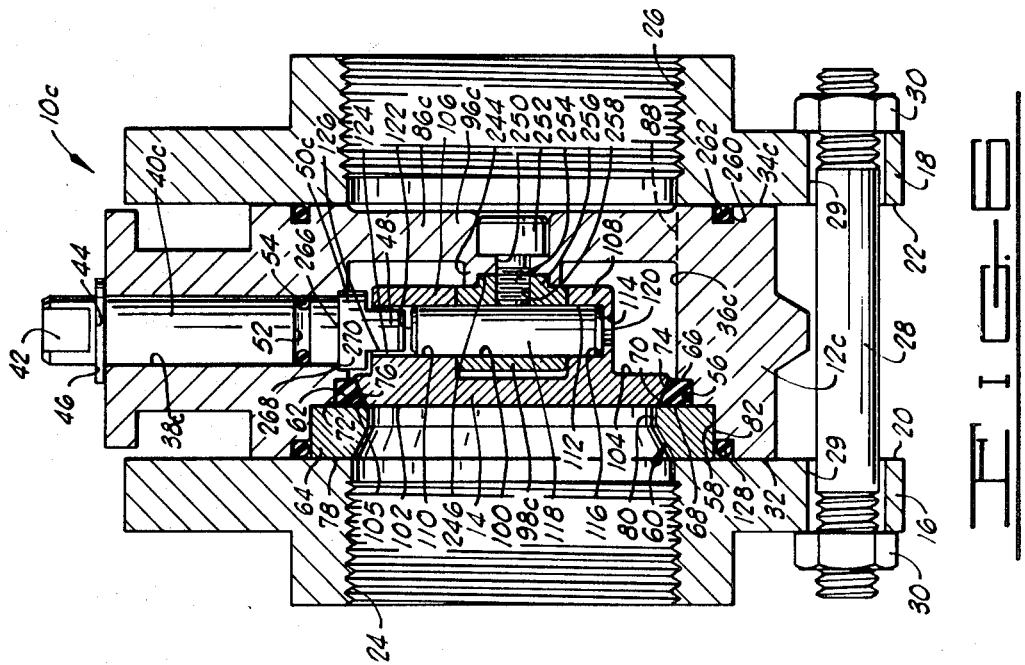
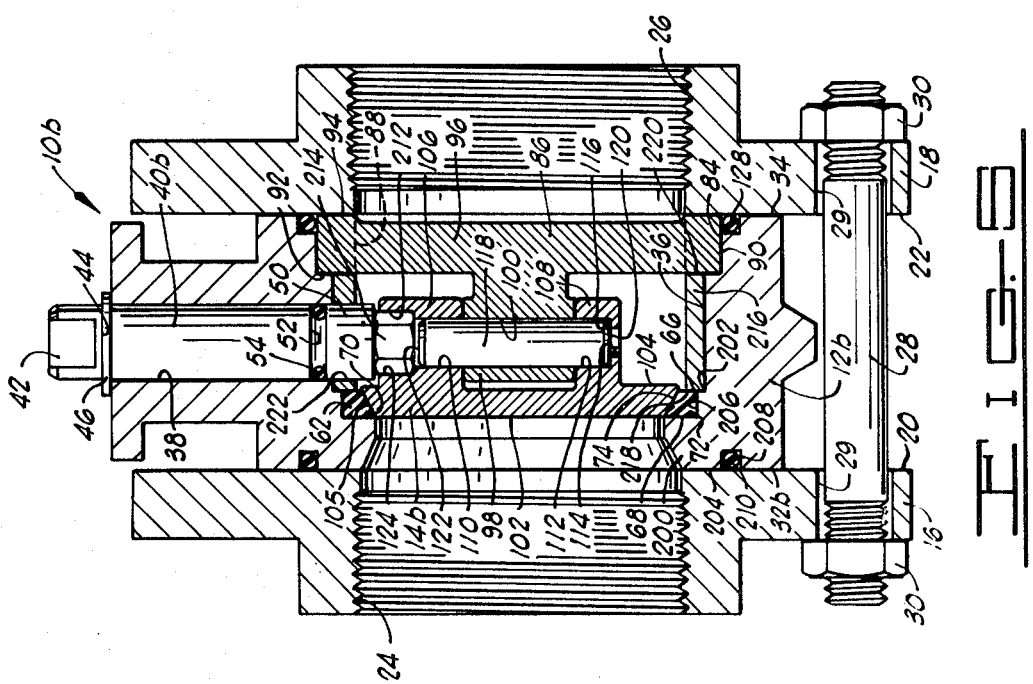

DISC VALVE ASSEMBLY WITH REPLACEABLE DISC AND SEATS

BACKGROUND OF THE INVENTION

1. Field of the Invention

This invention relates generally to improvements in valve assemblies, and more particularly, but not by way of limitation to an improved disc valve assembly utilizing an easily replaceable disc valve member and seat.

2. Description of the Prior Art

In the past there have been disc valve assemblies, having a disc valve member journaled in an upper and a lower portion of the valve body. This particular construction was found to be highly desirable in those applications involving the handling of fluids under a high pressure. In these particular disc valve assemblies, the disc valve member was usually either connected to a pair of valve stems (one valve stem being journaled in a lower portion of the valve body), or was connected to a single valve stem having a sufficient length, such that an upper portion thereof was journaled in an upper portion of the valve body and a lower portion thereof was journaled in a lower portion of the valve body.

From the foregoing description, it may be observed that a certain amount of wearing will occur between the valve body and the adjacent valve stem. This wearing would of course increase in high-pressure applications where the disc valve member is rotated during a time when a large pressure differential exists across the disc valve member. It should also be noted that in applications involving the handling of corrosive fluids, corrosion will occur between the rotational interconnecting elements. Wearing or corrosion between these rotational interconnecting elements would in many instances result in having to replace the entire valve body, a costly repair procedure.

To eliminate this particular problem, some disc valve assemblies have included sleeve-type earings about the valve stems, disposed between the valve stems and the valve body. However, to replace the sleeve bearings, it was generally required to substantially disassemble the valve assembly, and with respect to corrosive fluid applications, this particular construction still did not eliminate the destruction of those portions of the valve body adjacent the rotational interconnecting elements of the disc valve member.

Since the seats in a disc valve assembly constitute one of the main components which determine the sealing integrity of the disc valve assembly, the replacement of the seats becomes extremely important. This replacement of the seats is frequently accomplished in the field, and in many applications the downtime encountered during this replacement procedure is extremely critical and expensive. It would therefore be highly desirable to have a disc valve assembly, wherein the seats are adapted such that they may be simply inserted axially in the valve body in a simple, quick manner, which would assure proper positioning of the seat with respect to the disc valve member.

SUMMARY OF THE INVENTION

The present invention contemplates a valve assembly which includes a valve body having opposite end faces and a bore extending therethrough. A valve stem, having an upper and a lower end, is journaled in the valve body. A seat is supported in the valve body, and has a seating surface formed thereon. A disc valve member is rotatingly disposed in the bore of the valve body, and is adapted to be inserted axially into the bore of the valve body. The disc valve member has a seating surface formed about the outer periphery thereof shaped and positioned to seatingly and sealingly engage the seating surface of the seat, in one position of the disc valve member. The disc valve member includes a stem connection means thereon, adapted to connect the disc valve member to the lower end portion of the valve stem, so that the disc valve member may be rotated about a turning axis from a fully open to a fully closed position. The disc valve member is supported in the valve body separate from the valve stem, such that the axial thrust created by a pressure differential across the disc valve member is carried by the valve body, but is not exerted on the valve stem.

An object of the invention is to provide a disc valve assembly which can be quickly and easily repaired in the field.

Another object of the invention is to provide a disc valve assembly wherein the seats are removably disposed in the valve body to facilitate assembly or repair of the disc valve assembly.

A further object of the invention is to provide a disc valve assembly wherein a pressure differential across the disc valve member is carried by the valve body such that no portion thereof is exerted on the valve stem.

One other object of the invention is to provide a disc valve assembly which is useful in high-pressure applications.

A still further object of the invention is to provide a disc valve member wherein all of the rotational interconnecting components of the disc valve member are removable and replaceable, to reduce cost and to facilitate assembly and field repair of the valve assembly.

Other objects and advantages of the invention will be evident from the following detailed description when read in conjunction with the accompanying drawings which illustrate various embodiments of the invention.

BRIEF DESCRIPTION OF THE DRAWINGS

FIG. 1 is a sectional view of a valve assembly assembled between two flanges.

FIG. 2 is a sectional view of the valve of the valve assembly of FIG. 1, but showing the disc valve member and the associated components and the seat assembly disassembled from the valve body.

FIG 5 is another view similar to FIG. 1, but showing another modified valve assembly.

FIG. 6 is another view similar to FIG. 1, but showing yet another modified valve assembly.

DESCRIPTION OF THE PREFERRED EMBODIMENT

Figure 3:
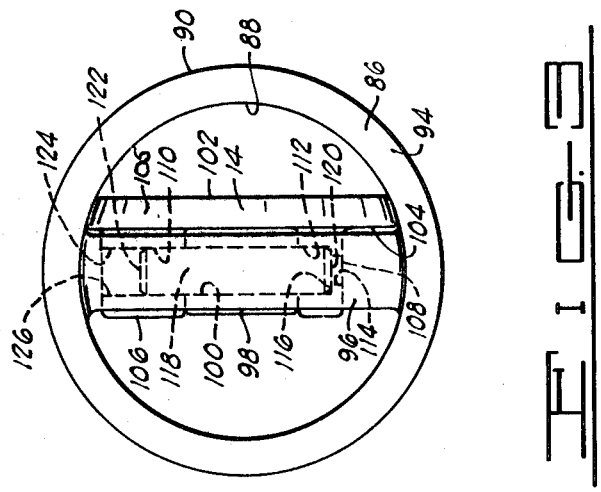
FIG. 3 is a sectional view of the disc valve member of FIG. 2, taken substantially along the lines 3—3 of FIG. 2.

Referring to the drawings in detail, and to FIGS. 1 and 2 in particular, shown therein and designated by the general reference character 10, is a valve assembly basically comprising a valve body 12 and a disc valve member 14 rotatably disposed therein.

The valve assembly 10, as shown in FIG. 1, is disposed generally between a pair of flanges 16 and 18, respectively. Each of the flanges 16 and 18, includes an end face 20 or 22, and a threaded opening 24 or 26, respectively. The threaded openings 24 and 26 are axially aligned and sized to receive the threaded ends of adjacent sections of a conduit (not shown).

The valve body 12 and the flanges 16 and 18 are held in an assembled relationship by a plurality of threaded bolts 28 that extend through apertures 29 in the flanges 16 and 18, and about the outer periphery of the valve body 12. Each of the bolts 28 is provided with a pair of threaded nuts 30 that engage the flanges 16 and 18.

The valve body 12 is basically tubular shaped, and has opposite end faces 32 and 34, and a bore 36 extending therethrough intersecting the end faces 32 and 34. An aperture 38 extends transversely through the valve body 12, intersecting the bore 36 therein.

A valve stem 40 is journaled in the valve body 12, and extends through the transversely extending aperture 38. Thus, the center line of the valve stem 40 extends generally at a right angle to the center line of the bore 36 of the valve body 12. The upper portion 42 of the valve stem 40 is adapted to receive and cooperate with a valve handle or other appropriate operator (not shown), for turning the valve stem 40 and thereby rotating the disc valve member 14 from a fully open to a fully closed position, as will be described more fully below. Various forms of the valve handles and valve operators are well known in the art and no further description is required herein.

A groove 44 is formed in the upper portion 42 of the first valve stem 40 and a retaining ring 46 is disposed in the groove 44 to limit the downward movement of the first valve stem 40 in the aperture 38. A rectangularly shaped end 48 is formed on a lowermost end portion 50 of the valve stem 40, for reasons which will be made more apparent below.

A second annular groove 52 is formed in the valve stem 40 generally between the upper portion 42 and the lower most end portion 50 thereof. An O-ring seal member 54 is disposed in the groove 52. The O-ring seal member 54 is sized to sealingly engage the walls of the valve body 2 formed by the aperture 38 and the valve stem 40, thereby providing a fluidtight seal therebetween.

A pair of counterbores 56 and 58 are formed in one end of the valve body 12 concentrically around the body bore 36. As shown in FIGS. 1 and 2, the counterbore 58 has a larger diameter than the counterbore 56. The counterbores 56 and 58 are provided to receive and cooperate with the seat assembly 60. The seat assembly 60 basically comprises an annular seal ring 62 and an annular retaining ring 64. As shown more clearly in FIG. 2, the seal ring 62 and the retaining ring 64 are sized to be inserted axially in the valve body 12.

The seal ring 62 has a valve member end 66, a nonvalve member end 68, an inner periphery 70 and an outer periphery 72. A seating surface 74 is formed on the inner periphery 70, generally between the valve member end 66 and the nonvalve member end 68 of the seal ring 62. The seating surface 74 is shaped and positioned in the valve body 12 to sealingly engage a portion of the outer periphery of the disc valve member 14, when the disc valve member 14 has been rotated to the closed position, as will be described in greater detail below. The outer periphery 72 of the seal ring 62 is sized to slidingly fit in the counterbore 56 of the valve body 12.

The retaining ring 64 is preferably constructed of a reinforced plastic or a metal, and has a valve member end 76, a nonvalve member end 78, an inner periphery 80 and an outer periphery 82. The outer periphery 82 of the retaining ring 64 is sized to provide a sliding fit in the counterbore 58 of the valve body 12.

As shown more clearly in FIG. 1, the retaining ring 64 is sized such that in the assembled position, a portion of the valve member end 76 of the retaining ring 64 abuts the wall formed between the counterbores 56 and 58 in the valve body 12, thereby positioning the retaining ring 64 therein. In that position, a portion of the valve member end 76 of the retaining ring 64 generally adjacent the inner periphery 80 thereof will abut the nonvalve member end 68 of the seal ring 62, and the nonvalve member end 78 of the retaining ring 64 will be coplanar with the end face 32 of the valve body 12. As shown in FIG. 1, the end face 20 of flange 16 abuts the end face 32 of the valve body 12 and the nonvalve member end 78 of the retaining ring 64. The retaining ring 64 thereby cooperates with the flange 16 to secure the seal ring 62 in an assembled position in the valve body 12.

It is apparent from the foregoing, that the axial load created by the tightening of the flanges 16 and 18 is transmitted through the retaining ring 64 and is carried by the valve body 12. The axial load is therefore not exerted on the seal ring 62. This particular construction prevents the seal ring 62 from being forced into a binding engagement with the disc valve member 14, due to an over tightening of the flanges 16 and 18.

The valve body 12 includes another counterbore 84, formed in the opposite end of the bore 36 and intersects the end face 34 of the valve body 12. The counterbore 84 is provided to receive and cooperate with an annular disc valve supporting ring 86. As shown more clearly in FIG. 3, the support ring 86 is ring-shaped, and has an inner periphery 88, an outer periphery 90, and opposite end faces 92 and 94. The outer periphery 90 of the support ring 86 is sized to slidingly fit in the counterbore 84 in the valve body 12, to a position wherein the end face 92 of the support ring 86 abuts the wall formed between the bore 36 and the counterbore 84, and the end face 94 of the support ring 86 is coplanar with the end face 34 of the valve body 12.

The support ring 86 includes a bar 96 (shown more clearly in FIG. 3), which extends diametrically across the inner periphery 88 of the support ring 86, and is secured at its opposite ends thereto. The bar 96 has a boss 98 (FIG. 2) formed on a central portion thereof, and extending a distance axially therefrom. The boss 98 has an aperture 100 extending transversely therethrough, for reasons which will be made more apparent below.

The disc valve member 14 is preferably constructed of a rigid material and is basically circular shaped having opposite end faces 102 and 104. A seating surface 105 is formed about the outer periphery of the disc valve member 14, generally between the end faces 102 and 104 thereof. The seating surface 105 is sized and shaped to seatingly engage the seating surface 74 of the seal ring 62 when the disc valve member 14 is rotated to the closed position.

An upper and a lower boss 106 and 108, respectively, are formed on the end face 104 of the disc valve member 14, and extend axially therefrom. The upper and lower bosses 106 and 108 are spaced a distance radially apart, such that in the assembled position, as shown more clearly in FIG. 1, the boss 98 of the support ring 86 will slidingly extend therebetween.

A transversely extending aperture 110 is formed in the upper boss 106, and a similar transversely extending aperture 112 is formed in the lower boss 108. The aperture 112 in the lower boss 108 is varied in diameter such that the lower portion 114 thereof is of a smaller diameter than the remaining upper portion thereof, thereby providing an upwardly facing surface 116 about the aperture 112, for reasons to be made more apparent below.

In the assembled position, as shown in FIG. 1, the boss 98 and the support ring 86 are adapted to be inserted axially into the valve body 12, to a position wherein the boss 98 extends between the upper and lower bosses 106 and 108 of the disc valve member 14, and the aperture 100 of the boss 98 is radially aligned with the apertures 110 and 112 of the upper and lower bosses 106 and 108, respectively. A pin 118 is journally disposed through the apertures 110 and 112 of the upper and lower bosses 106 and 108, respectively, and through the aperture 100 of boss 98, thereby providing the interconnection between the supporting ring 86 and disc valve member 14. The pin 118 is supported in this interconnecting position by the engagement of a lower end 120 thereof with the upwardly facing surface 116 in the aperture 112.

The pin 118 is sized such that in the assembled position, an upper end 122 thereof will extend only a distance into the aperture 110, thereby providing a space 124 between the upper end 122 of the pin 118 and the outer end edge of the upper boss 106.

A rectangularly shaped slot 126 is formed in the portion of the aperture 110 generally adjacent the outer edge thereof. The slot 126 is sized to interconnectingly receive the rectangular end 48 of the first valve stem 40, thereby providing the interconnection therebetween.

An additional counterbore 128 is formed in each end of the valve body 12 intersecting the respective end face 32 or 34 thereof, and an O-ring seal member 130 is disposed in each counterbore 128. The O-ring 130 generally adjacent the end face 32 of the valve body 12 is sized to sealingly engage the valve body 12, the outer periphery 82 of the retaining ring 64, and the end face 20 of flange 16, thereby providing a fluidtight seal therebetween. The O-ring 130 generally adjacent the end face 34 of the valve body 12 is sized to sealingly engage the outer periphery 90 of the support ring 86, the valve body 12 and the end face 22 of the flange 18, thereby providing a fluidtight seal therebetween.

OPERATION OF FIGS. 2 AND 3

The disc valve member 14 is rotatably secured to the supporting ring 86 by the pin 118 as a separate unit, as shown more clearly in FIGS. 2 and 3. The supporting ring 86 and the disc valve member 14 are then inserted axially into the bore 36 of the valve body 12, to a position wherein the supporting ring 86 is disposed in the counterbore 84 of the valve body 12 and the end face 92 of the supporting ring 86 abuts the wall formed by the counterbore 84. In this position, the rectangular end 48 of the valve stem 40 is inserted in the slot 126 of the upper boss 106.

The seal ring 62 and the retaining ring 64 are adapted to be inserted axially into the respective counterbores 56 and 58 in the valve body 12. The seal ring 62 and the retaining ring 64 are held in this assembled position by the flange 16, as shown in FIG. 1.

The turning movement of the first valve stem 40 is transmitted to the disc valve member 14 via the interconnection between the rectangular end 48 of the first valve stem 40 and the slot 126 of the upper boss 106. The disc valve member 14 may thus be rotated from an open position, that is a position wherein the disc valve member 14 is in a plane parallel with the center line of the bore 36 through the valve body 12, to a closed position, that is a position wherein the disc valve member 14 is transverse to the bore 36 through the valve body 12.

When the disc valve member 14 is rotated to the closed position, no fluid will flow through the valve 10 since the sealing surface 74 of the seal ring 62 will be in sealing engagement with the seating surface 105 of the disc valve member 14 about the entire periphery thereof. The sealing engagement established between the disc valve member 14 and the seal ring 62 is offset from the turning axis of the valve assembly 10. The disc valve member 14 is therefore what is commonly referred to in the art as an offset disc valve member. This feature enables the disc valve member 14 to cooperate with the seal ring 62 to provide a tighter fluidtight seal therebetween, which is particularly important in high-pressure applications, and yet retain most of the space-saving features of a disc-type valve member.

In the closed position, a pressure differential is established across the disc valve member 14, tending to move the disc valve member 14 in a generally downstream direction. When the end 32 is the upstream end of the valve body, the thrust created by this pressure differential is carried by the support ring 86 via the interconnection between the disc valve member 14 and the support ring 86 provided by the pin 118. When the pressure is in the opposite direction, the thrust is also carried by the valve body 12 in a manner similar to that described above. It is apparent from the foregoing, that the first valve stem 40 is not subject to any portion of the thrust created by the pressure differential, and therefore it is not subject to any additional wear or destruction resulting therefrom.

Since the disc valve member 14 is journally connected to the supporting ring 86 by the pin 118 at an upper and a lower portion via the apertures 110 and 112 in the upper and lower bosses 106 and 108, respectively, and the respective interconnecting portions of the pin 118, the thrust transmitted to the supporting ring 86 is generally in an axial direction. This type of interconnection minimizes the rotational forces created by the resulting thrust, and the wearing, binding and otherwise destructive effect of such forces on the rotational interconnecting portions of the valve assembly 10, particularly as compared to a valve assembly wherein the disc valve member is connected at an upper portion thereof to a single valve stem.

It should also be noted, in a preferred form and as shown in FIGS. 1, 2 and 3, the upper and lower bosses 106 and 108 of the disc valve member 14 are disposed generally toward a central portion of end face 104 of the disc valve member 14. Due to this concentration of the load-carrying members of the valve assembly 10 toward a central portion of the disc valve member 14, the disc valve assembly 10, is able to carry a larger axial load or thrust, than in those situations where the valve member is journaled by a single long valve stem extending into the valve body above and below the disc.

A certain amount of wearing will occur between those portions of the disc valve member 14 and portions of the support ring 86 which are journally connected by the pin 118, and of course in those applications involving the handling of corrosive fluids these portions will be subject to the corrosive effect of such fluids. However, in the valve assembly 10, all of the rotational interconnecting elements of the disc valve member 14, that is the disc valve member 14, the support ring 86, and the pin 118, are quickly and easily replaced via axial insertion in the valve body 12.

It should also be noted that the first valve stem 40 is constructed such that it is assembled by simply inserting it downwardly in the aperture 38 of the valve body 12. This particular feature enables the valve stem 40 to be removed, and replaced or repaired, without having to completely disassemble the valve assembly 10.

It is apparent from the foregoing, that the valve assembly 10 provides an offset disc valve member which may be quickly and easily removed for replacement or repair. The disc valve member 14 is supported in the valve body 12 such that the thrust created by a pressure differential across the valve member is not carried by the vale stem, and the rotational interconnecting portions of the disc valve member are insertable axially for easy replacement or repair. The valve assembly 10 also provides additional load-carrying capacity, due to the concentration of the load-carrying members toward a central portion of the disc valve member 14, and yet provides a disc valve member which is journally supported at an upper and a lower portion thereof.

EMBODIMENT OF FIG. 4

Figure 4:
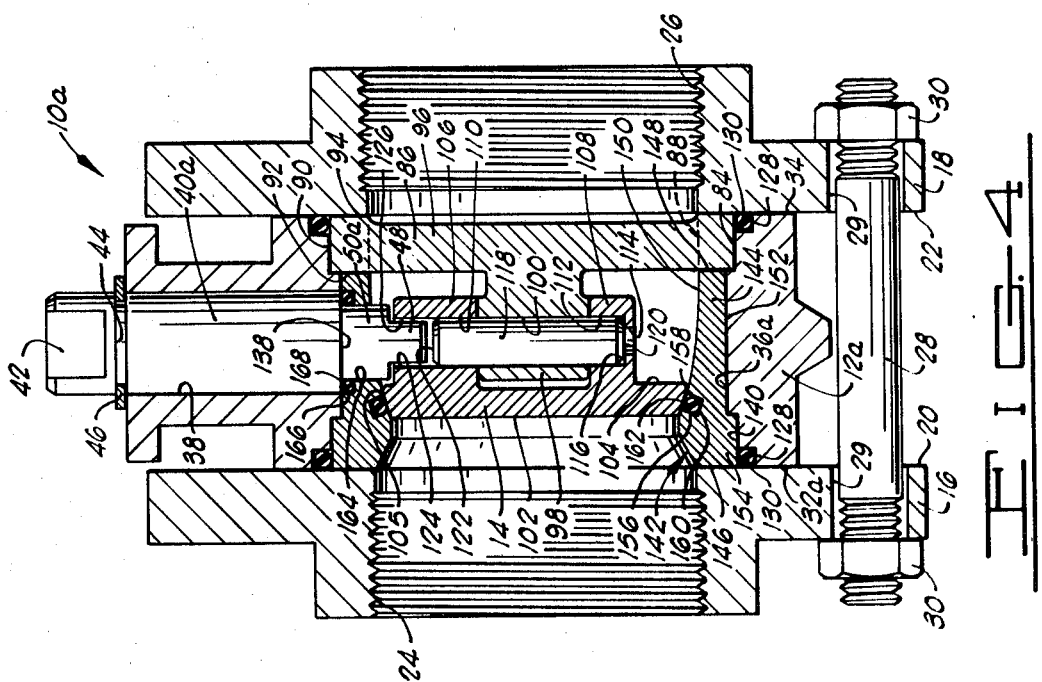
FIG. 4 is a view similar to FIG. 1, but showing a modified valve assembly.

The valve assembly 10a, shown in FIG. 4 is constructed in the same manner as the valve assembly 10, shown in FIGS. 1 and 2 and 3, except as described below.

The valve stem 40a is constructed similar to the first valve stem 40, shown in FIGS. 1, 2 and 3, except the lower portion 50a of the first valve stem 40a has a smaller diameter than the remaining upper portion of the first valve stem 40a. The smaller diameter of the lower portion 50a forms a downwardly facing surface 138, encircling the first valve stem 40a. It should also be noted, that the first valve stem 40a does not have a groove and an O-ring seal member, similar to the groove 52 and O-ring 54 of the first valve stem 40, for reasons to be made apparent below.

The valve body 12a has only one major counterbore 140 which intersects the end face 32 thereof, and the counterbore 140 is provided to receive and cooperate with a seat assembly 142.

The seat assembly 142 basically comprises an annular seat ring 144, which may be constructed of a metal or an elastomeric material. The seat ring 144 has opposite ends 146 and 148 and inner and outer peripheries 150 and 152, respectively. The outer periphery 152 of the seat ring 144 is sized to slidingly fit into the bore 36a of the valve body 12a. A radially extending flange 154 is formed on the outer periphery 152, generally adjacent the end 146 of the seat ring 144. The flange 154 is sized and positioned to slidingly fit into the counterbore 140 of the valve body 12a, and to engage the wall formed in the valve body 12a between the bore 36a and the counterbore 140 to limit the inward axial movement of the seat ring 144 in the bore 36a of the valve body 12a.

The axial length of the seat ring 144, between the opposite ends 146 and 148 thereof, is sized such that in an assembled position the end 146 is coplanar with the end face 32a of the valve body 12a and the end 148 is adjacent the end face 92 of the support ring 86. It should be noted that in those instances where the seat ring 144 is constructed of an elastomeric material, the axial length of the seat ring 144 may be slightly greater than that described above. In particular, the axial length of the seat ring 144 may be such that the end 146 thereof extends slightly beyond the end face 32a of the valve body 12a, thereby enabling the end 146 to sealingly engage the end face 20 of the flange 16. Where the seat ring 144 is constructed of an elastomeric material, the axial length of the seat ring 144 may also be sized such that the end 148 thereof sealingly engages the end face 92 of the support ring 86, thereby creating a fluidtight seal therebetween.

A portion 156 of the seat ring 144 extends radially inward beyond the inner periphery 150 of the seat ring 144, and a seating surface 158 is formed on an inner periphery of the portion 156. The seating surface 158 of the seat ring 144 is sized and positioned in the valve body 12a to seatingly engage the seating surface 105 of the disc valve member 14, when the disc valve member has been rotated to the closed position. A groove 160 is formed in the seating surface 158, and an annular O-ring seal member 162 is disposed in the groove 160. The O-ring seal member 162 is sized to sealingly engage the seating surface 105 of the disc valve member 14, when the disc valve member 14 has been rotated to the closed position, as shown in FIG. 4.

An aperture 164 is formed in an upper portion of the seat ring 144. The aperture 164 is sized and disposed to receive a portion of the lower portion 50a of the first valve stem 40a, as shown in FIG. 4. A counterbore 166 is formed in the upper portion of the aperture 164, intersecting the outer periphery 152 of the seat ring 144. An O-ring seal member 168 is disposed in the counterbore 166. In an assembled position, the O-ring 168 is sized and disposed to sealingly engage the downwardly facing surface 138 of the first valve stem 40a, and form a fluidtight seal between the seat assembly 142 and the first valve stem 40a.

OPERATION OF FIG. 4

The valve assembly 10a will operate substantially the same as the valve assembly 10, described before. The salient differences being the one-piece construction of the seat assembly 142 and the cooperation of the seat assembly 142 and the valve stem 40a to provide a fluidtight seal therebetween. It should be noted that although the O-ring 168 operates to provide the primary sealing engagement between the valve stem 40a and the seat assembly 142, an O-ring could also be included about the first valve stem 40a similar to that described with respect to the valve stem 40, to operate as a secondary or backup stem seal.

It is apparent from the foregoing that the valve assembly retains all of the advantages of the valve assembly 10, described before.

EMBODIMENT OF FIG. 5

The valve assembly 10b, shown in FIG. 5, is constructed in the same manner as the valve assembly 10, shown in FIGS. 1, 2 and 3, except as described below.

The valve body 12b does not have a plurality of counterbores formed in the end face 32b thereof, as does the valve body 12. A radially inwardly extending flange ring 200 is formed in the bore 36 of the valve body 12b, generally adjacent the end face 32thereof.

The flange ring 200 has a valve member end 202 and a nonvalve member end 204. The nonvalve member end 204 is coplanar with the end face 32b of the valve body 12b, and a groove 206 is formed in the valve member end 202 of the flange ring 200. The groove 206 is sized and disposed in the valve body 12b to receive and cooperate with the seal ring 62, in a manner to be described more fully below.

A groove 208 is formed in the end face 32b, and an O-ring seal member 210 is disposed in the groove 208. The O-ring 210 is sized to sealingly engage the valve body 12b and the end face 20 of the flange 16, thereby forming a fluidtight seal therebetween.

The disc valve member 14b is constructed exactly like the disc valve member 14, shown in FIGS. 1, 2 and 3, except in lieu of a rectangular slot in the upper portion of the aperture 110, a hexagonally shaped recess 212 is formed therein. The hexagonally shaped recess 212 is sized to receive and cooperate with a hexagonally shaped lower end portion 214 formed on the valve stem 40b, thereby providing the interconnection between the valve stem 40b and the disc valve member 14b.

A retaining ring 216, having a valve member end 218 and a nonvalve member end 220 is disposed in the bore 36 of the valve body 12b. The outer periphery of the retaining ring 216 is sized to slidingly fit into the bore 36 of the valve body 12b.

In the assembled position, as shown in FIG. 5, a portion of the valve member end 218 of the retaining ring 216 engages the valve member end 202 of the flange ring 200, to limit the inward axial movement and to position the retaining ring 216 in the bore 36 of the valve body 12b. The remaining portion of the valve member end 218 of the retaining ring 216 engages a portion of the valve member end 66 of the seal ring 62, thereby securing the seal ring 62 in position in the groove 206 of the flange ring 200.

The axial length of the retaining ring 216, that is, the length between the valve member end 218 and the nonvalve member 220 thereof, is sized such that, in the assembled position, the nonvalve member end 220 engages the end face 92 of the supporting ring 86. The supporting ring 86 thus secures the retaining ring 216 in position in the bore 36 of the valve body 12b, and cooperates therewith to securely position the seal ring 62 in position.

The retaining ring 216 also includes an aperture 222 through an upper portion thereof. The aperture 222 is sized such that the lower end portion 50 of the first valve stem 40b may be extended therethrough.

OPERATION OF FIG. 5

The valve assembly 10b will operate substantially the same as the valve assembly 10, shown in FIGS. 1, 2 and 3.

The turning movement of the valve stem 40b is transmitted to the disc valve member 14b via the interconnection between the hexagonally shaped end portion 214 of the valve stem 40b and the recess 212 in the upper boss 106. The disc valve member 14b may thus be rotated from an open to a closed position.

In the closed position, the seal ring 62 will cooperate with the seating and sealing surface 105 of the disc valve member 14b exactly as described before with respect to the valve assembly 10.

The flange ring 200 operates substantially the same as the retaining ring 64 to transmit to the valve body 12b the thrust created by tightening the bolts 28 and thereby securing the flanges 16 and 18, in the assembled position. The thrust therefore does not bias the seal ring 62 into a binding engagement with the disc valve member 24b, which in some instances, particularly high-pressure applications, would make it difficult to rotate the disc valve member 14b, or result in a premature wearing or destruction of the seal ring 62.

One of the significant differences between the construction of the valve assembly 10b and the valve assembly 10, is that in the valve assembly 10b, the supporting ring 86, the disc valve member 14b, the seal ring 62 and the retaining ring 216 are all insertable and removable from the same end of the valve body 12b, that is, the end adjacent the end face 34 thereof. This particular feature can be important in field repair of the valve assembly 10b, since it is only necessary to remove the flange 18 to gain access to all of the removable portions of the valve assembly 10b.

It is therefore apparent from the foregoing that the valve assembly 10b retains all of the advantages of the valve assembly 10 and in addition provides a modified construction which may be repaired in the field in an even simpler and quicker manner.

EMBODIMENT OF FIG. 6

The valve assembly 10c is also constructed similar to the valve assembly 10, shown in FIGS. 1, 2 and 3, and only those portions of the valve assembly 10c which differ substantially will be described in detail below.

The valve body 12c is similar to the valve body 12, except a plurality of counterbores are not provided in the end face 34c thereof. A support ring is formed in the bore 36 of the valve body 12c generally adjacent the end face 34c thereof. The support ring is constructed almost exactly like the supporting ring 86, shown in FIGS. 1, 2 and 3, and is therefore designated by the reference numeral 86c. One difference between the support rings 86c and 86, is that the support ring 86c is formed as an integral part of the valve body 12c, and the remaining differences will be described below.

The bar 96c has a boss 244 formed on a central portion thereof. A recess 246 is provided in the boss 244, for reasons which will become apparent below. The bar 96c also has an aperture 250 formed through a central portion thereof intersecting the recess 246. The aperture 250 is sized to receive and cooperate with the head 252 of a threaded bolt 254.

The boss 98c is almost identical to the boss 98, shown in FIGS. 1, 2 and 3, except the boss 98c is not formed integral with the bar 96c, as was the boss 98 and the bar 96. The boss 98c is thus a separate component, and includes a raised portion 256 which is sized and disposed to fit into the recess 246 of the bar 96c, thereby locating the boss 98c on the supporting ring 86c. A threaded recess 258 is formed in the raised portion 256. The threaded recess 258 is sized to receive a portion of the threaded end of the bolt 254. Thus, the boss 98c and the bar 96c are secured in an assembled relationship by the bolt 254.

The valve body 12c includes a groove 260 in the end face 34c and an O-ring seal member 262 is disposed in the groove 260. The O-ring 262 is sized to sealingly engage the valve body 12c and the end face 22 of the flange 18, thereby providing a fluidtight seal therebetween.

The valve stem 40c is constructed exactly like the valve stem 40, except the lower portion 50c of the valve stem 40c is of a larger diameter than the remaining upper portion thereof. The lower portion 50c thereby forms an upwardly facing surface 266 encircling the valve stem 40c.

A counterbore 268 is formed in the aperture 38c generally adjacent the bore 36 in the valve body 12c, thereby providing a downwardly facing surface 270 encircling the aperture 38c. The counterbore 268 is sized to receive and cooperate with the lower portion 50c of the valve stem 40c, thereby limiting the upward movement of the first valve stem 40c in the aperture 38c.

It should also be noted that the engagement of the lower portion 50c of the valve stem 40c with the valve body 12c will provide a secondary or backup metal-to-metal seal in the event the O-ring 54 of the valve stem 40c is destroyed. This particular type of a secondary seal construction associated with the valve stem 40c is not possible in most disc valve assemblies.

OPERATION OF FIG. 6

The valve assembly 10c, shown in FIG. 6, will operate substantially the same as the valve assembly 10, shown in FIGS. 1, 2 and 3. The salient differences being the particular construction of the valve stem 40c to provide a secondary metal-to-metal seal, and the construction of the major portion of the support ring 86c as an integral part of the valve body 12c.

It is apparent from the foregoing that the valve assemblies described herein, provide a disc valve assembly wherein all wearing components are easily insertable or removable for assembly or field repair of the valve assembly. The disc valve assemblies described herein also have a disc valve member which is journaled at an upper and a lower portion thereof, to minimize rotational forces encountered when the disc valve member is rotated to the closed position, and yet provides a disc valve assembly wherein all of the rotational interconnecting elements of the disc valve member are removable and replaceable, thereby eliminating the necessity of having to replace a valve body due to wearing or corrosion therebetween.

The invention also provides a valve assembly wherein the axial thrust created by a pressure differential across the disc valve member, when the disc valve member is rotated to the closed position, is carried by the valve body in such a manner that no portion thereof is exerted on the valve stem. Due to the construction of the load-carrying members, the valve assemblies described herein also provide addition load carrying capacity, particularly important in high-pressure applications.

Changes may be made in the construction and arrangement of parts or elements of the various embodiments as disclosed herein without departing from the spirit and scope of the invention.

What is claimed is:

1. A valve assembly, comprising:

a valve body having opposite end faces and a bore extending therethrough;

a disc valve member, having opposite end faces, rotatably supported in a portion of the valve body, said disc valve member having a seating surface formed about the outer periphery thereof generally between the opposite end faces;

seat means supported in the bore of the valve body having a seating surface formed thereon, said seating surface seatingly and sealingly engaging the seating surface on the disc valve member in one position of the disc valve member;

a support ring supported in the bore of the valve body, said support ring being spaced from the disc valve member;

an upper boss connected to one end face of the disc valve member and extending axially therefrom in a direction generally toward the support ring when the disc valve member is in the closed position, said upper boss having an aperture extending transversely therethrough;

a support ring boss connected to the support ring and extending axially therefrom in a direction generally toward the disc valve member, said support ring boss having an aperture formed transversely therethrough;

a pin journaled in the apertures in said bosses thereby journally connecting the disc valve member to the support ring; and a valve stem having an upper and a lower end, journaled in the valve body and extending at a right angle to the axis of the bore through the valve body with the lower end thereof connected to the upper boss of the disc valve member.

2. The valve assembly of 1 defined further to include:

a lower boss connected to the same end face of the disc valve member as the upper boss and extending axially from the disc valve member generally toward the support ring when the disc valve member is in the closed position, said lower boss spaced a distance radially from said upper boss and having an aperture extending transversely therethrough, said aperture in the lower boss being radially aligned with the aperture in the upper boss; and wherein the pin is further defined as having a portion thereof journally disposed in the aperture in the lower boss of the disc valve member.

3. The valve assembly of claim 2 wherein the support ring is further defined to include a bar extending diametrically across the inner periphery thereof, said bar being connected at the opposite ends thereof to the support ring; and wherein the support ring boss is connected to a central portion of said bar.

4. The valve assembly of claim 3 wherein the support ring boss is formed integral with said bar.

5. The valve assembly of claim 2 wherein the valve body includes a counterbore formed therein intersecting one end face thereof, said counterbore being sized to receive and cooperate with the support ring; and wherein the support ring is sized to be inserted axially into said counterbore in the valve body.

6. The valve assembly of claim 2 wherein the support ring is formed integral with the valve body; and wherein the means connecting the support ring to the disc valve member is defined further to include a bolt adapted to removably connect the support ring boss to the support ring.

7. The valve assembly of claim 2 wherein the aperture in the lower boss includes a portion thereof of a smaller diameter, thereby providing an upwardly facing surface encircling the aperture in the lower boss, said upwardly facing surface being sized and positioned to engage the lower end of the pin, thereby limiting the movement of the pin in one direction.

8. The valve assembly of claim 2 wherein the upper boss is spaced radially from the outer periphery of the disc valve member; and wherein the lower boss is spaced radially from the outer periphery of the disc valve member, said lower boss thereby cooperating with said upper boss to rotatingly support the disc valve member at a central portion thereof.

9. The valve assembly of claim 1 wherein the upper boss is further defined to include a recess in the upper portion thereof, said recess having a noncircular-shaped cross section; and wherein the lower end portion of the valve stem matingly and interconnectingly fits into the recess in the upper boss.

10. The valve assembly of claim 1 wherein the valve stem is defined further to include a flange portion formed on the lower end portion thereof engaging the valve body to limit the movement of the valve stem away from the valve disc.

11. The valve assembly of claim 1 wherein the seat means is defined further to include an elastomeric seal ring removably disposed in the bore of the valve body and having a seating surface formed around the inner periphery thereof, said seating surface being sized to sealingly engage the seating surface formed above the outer periphery of the disc valve member.

12. The valve assembly of claim 1 further defined to include:
a flange at each end of the valve assembly, each of said flanges having an end face facing one end face of the valve body; and
a plurality of circumferentially spaced bolts extending through each of the flanges respectively and about the outer periphery of the housing.

13. The valve assembly of claim 12 wherein the valve body is defined further to include a pair of adjacent counterbores in one end of the valve body, one of said counterbores having a smaller diameter than the other of said counterbores; and wherein the seat means is defined further to include:
an elastomeric seal ring removably disposed in the smaller diameter counterbore in the valve body, said seal ring having a sealing surface formed about the inner periphery thereof sized and disposed to seatingly and sealingly engage the seating surface formed about the disc valve member; and
a retaining ring removably disposed in the larger diameter counterbore in the valve body, said retaining ring having a valve member end and a nonvalve member end and sized such that a portion of the valve member end thereof engages the wall formed between the larger and smaller diameter counterbores and a portion of the remaining portion of the valve member end thereof engages a portion of the seal ring to retain the seal ring in position in the valve body, the nonvalve member end of said retaining ring being sized to engage a portion of the end face of one of the flanges and to cooperate therewith to secure the retaining ring in position in the valve body, such that the force created by the flange is carried by the valve body.

14. The valve assembly of claim 1 wherein the valve body is defined further to include a flange ring, having a valve member end, formed around the bore and extending a distance radially therein, the valve member end of said flange ring having a groove formed therein; and wherein the seat means is defined further to include an elastomeric seal ring removably disposed in the groove in the flange ring, said seat ring having a seating surface formed about the inner periphery thereof sized and disposed to sealingly and seatingly engage the seating surface on the disc valve member in one position of the disc valve member.

15. The valve assembly of claim 14 defined further to include a retaining ring, having opposite ends, removably disposed in the bore of the valve body, one of the ends being sized to engage a portion of the seal ring to retain the seal ring in position in the valve body.

16. The valve assembly of claim 15 wherein the retaining ring is sized such that the end opposite the end thereof in engagement with the seal ring engages a portion of the support ring to secure the retaining ring in position in the valve body.

17. The valve assembly of claim 1 wherein the seat means is defined further to include a relatively rigid seal ring removably disposed in the bore of the valve body and having a seating surface formed about a portion of the inner periphery thereof, said seating surface being sized to seatingly engage the seating surface of the disc valve member about the entire periphery thereof in one position of the disc valve member, said seating surface having a groove formed in a portion thereof; and an elastomeric seal member disposed in the groove in the seat ring, said seal member being sized to sealingly engage the seating surface of the disc valve member in one position thereof.

18. The valve assembly of claim 17 wherein the valve body includes a counterbore therein intersecting one end face thereof, said counterbore being sized and positioned to receive and cooperate with a portion of said seat ring; and wherein the seat ring is defined further to include a flange portion extending radially from the outer periphery thereof, said flange portion being sized and disposed to cooperate with the counterbore in the valve body to limit the axial movement of the seat ring in the valve body.